United States Patent
Yoneta

(10) Patent No.: US 7,486,654 B2
(45) Date of Patent: Feb. 3, 2009

(54) COMMUNICATION METHOD USED IN MOBILE COMMUNICATION SYSTEM

(75) Inventor: Tsuyoshi Yoneta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 11/410,373

(22) Filed: Apr. 25, 2006

(65) Prior Publication Data

US 2007/0171855 A1    Jul. 26, 2007

(30) Foreign Application Priority Data

Jan. 25, 2006  (JP)  ............................... 2006-016540

(51) Int. Cl.
*H04B 7/216* (2006.01)
(52) U.S. Cl. .................. 370/342; 370/328; 370/338; 455/423
(58) Field of Classification Search ................. 370/342, 370/328, 338; 455/423
See application file for complete search history.

(56) References Cited

U.S. PATENT DOCUMENTS

| | | | |
|---|---|---|---|
| 6,108,546 A | | 8/2000 | Kusaki et al. |
| 2002/0058493 A1 | | 5/2002 | Ikeda et al. |
| 2002/0111191 A1 | * | 8/2002 | Takatori et al. ............. 455/562 |
| 2005/0181834 A1 | | 8/2005 | Chen et al. |

FOREIGN PATENT DOCUMENTS

| | | |
|---|---|---|
| EP | 1207709 | 5/2002 |
| JP | 10-145835 | 5/1998 |
| KR | 2002-0037713 | 5/2002 |
| WO | 2005022798 | 3/2005 |

OTHER PUBLICATIONS

Extended European Search Report dated Jun. 12, 2007, for corresponding European Application EP 06 25 2174.
3 GPP TS 25.309 V6.4.0, $3^{RD}$ Generation Partnership Project; Technical Specification Group Radio Access Network; FDD Enhanced Uplink; Overall Description; Stage 2 (Release 6), Sep. 2005.
Decision of Rejections dated Jul. 29, 2008, from the corresponding Korean Application.
Korean Office Action dated Dec. 18, 2007, for the corresponding Korean Patent Application 10-2007-1692.

* cited by examiner

*Primary Examiner*—Nghi H Ly
(74) *Attorney, Agent, or Firm*—Katten Muchin Rosenman LLP

(57) ABSTRACT

A mobile terminal is connected to both first and second base station devices when handover is performed. Each of the first and second base station devices is connected to an upper level device. The first base station device is authorized to request retransmission of data to the mobile terminal when there is a bit error in an up-link for transmitting data from the mobile terminal to the first base station device. When a bit error is detected in the up-link from the mobile terminal to the first base station device, and no bit error is detected in the up-link from the mobile terminal to the second base station device, the first base station device does not perform retransmission control, and the second base station device transfers the received data to the upper level device.

14 Claims, 16 Drawing Sheets

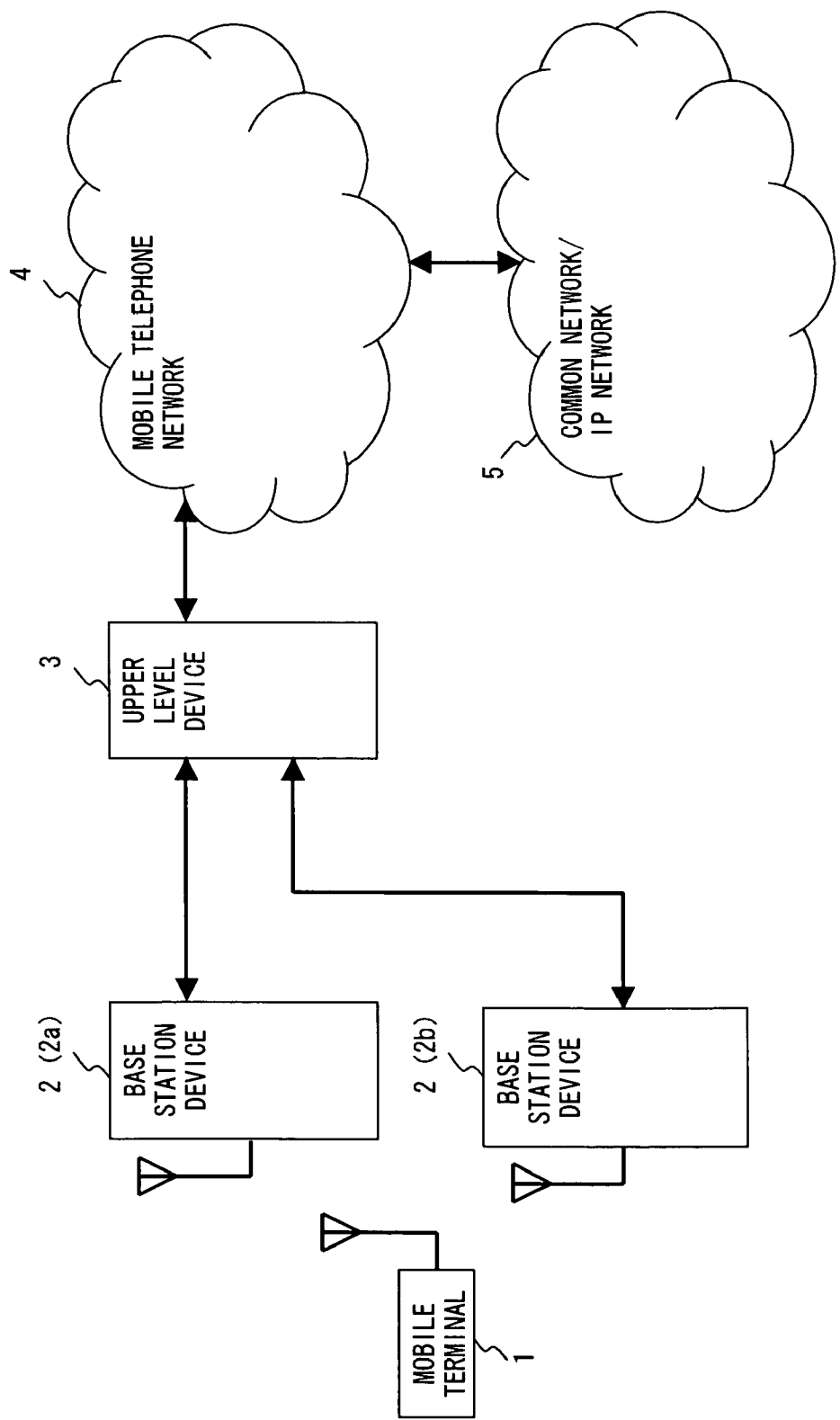
F I G. 1

| TERMINAL ID | AUTHORIZATION | HANDOVER |
|---|---|---|
| #1 | AUTHORIZED | 1 |
| #2 | NOT AUTHORIZED | 1 |
| #3 | AUTHORIZED | 0 |
| ⋮ | ⋮ | ⋮ |

F I G. 3

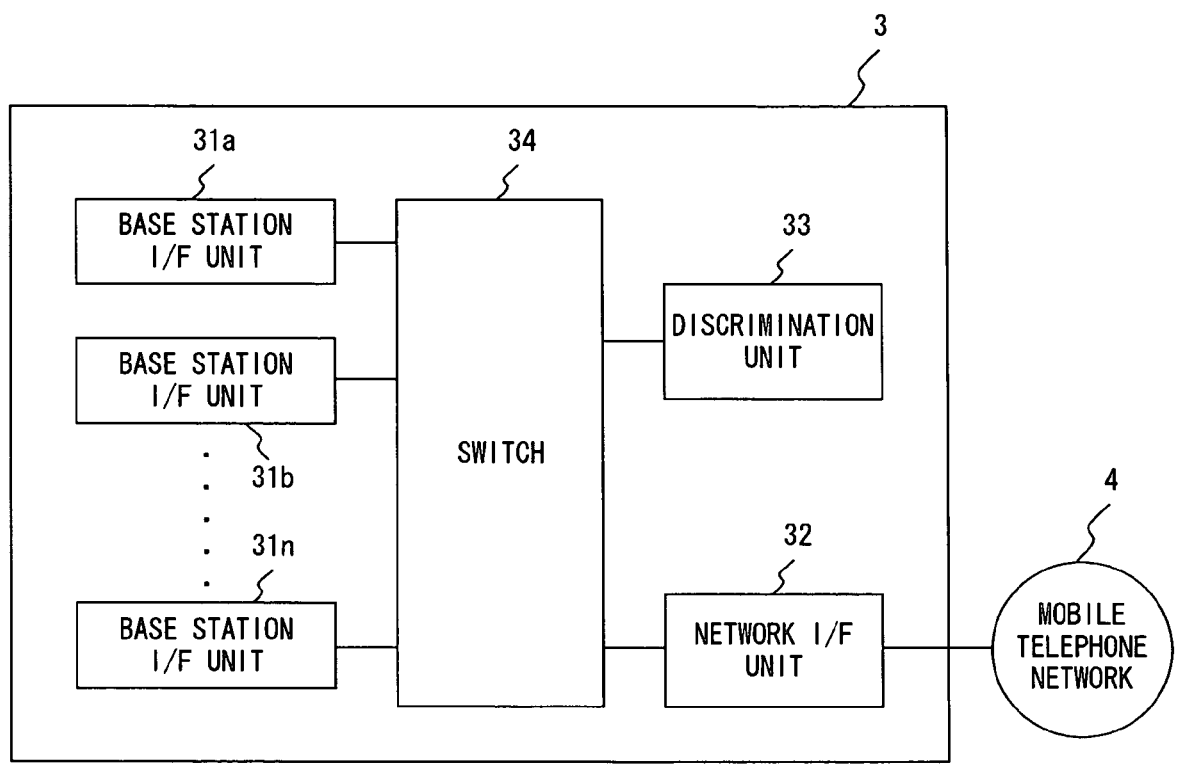
F I G. 4

| TERMINAL ID | MAIN BASE STATION | ADJACENT BASE STATION |
|---|---|---|
| #1 | 2a | 2b |
| #2 | 2c | 2d |
| #5 | 2e | 2f |
| ⋮ | ⋮ | ⋮ |

STATUS MANAGEMENT TABLE OF BASE STATION 2a

| TERMINAL ID | AUTHORIZATION | HANDOVER |
|---|---|---|
| #1 | AUTHORIZED | 0 |

STATUS MANAGEMENT TABLE OF BASE STATION 2b

| TERMINAL ID | AUTHORIZATION | HANDOVER |
|---|---|---|

HANDOVER MANAGEMENT TABLE

| TERMINAL ID | MAIN BASE STATION | ADJACENT BASE |
|---|---|---|

FIG. 7B

STATUS MANAGEMENT TABLE OF BASE STATION 2a

| TERMINAL ID | AUTHORIZATION | HANDOVER |
|---|---|---|
| #1 | AUTHORIZED | 1 |

STATUS MANAGEMENT TABLE OF BASE STATION 2b

| TERMINAL ID | AUTHORIZATION | HANDOVER |
|---|---|---|
| #1 | NOT AUTHORIZED | 1 |

HANDOVER MANAGEMENT TABLE

| TERMINAL ID | MAIN BASE STATION | ADJACENT BASE |
|---|---|---|
| #1 | 2a | 2b |

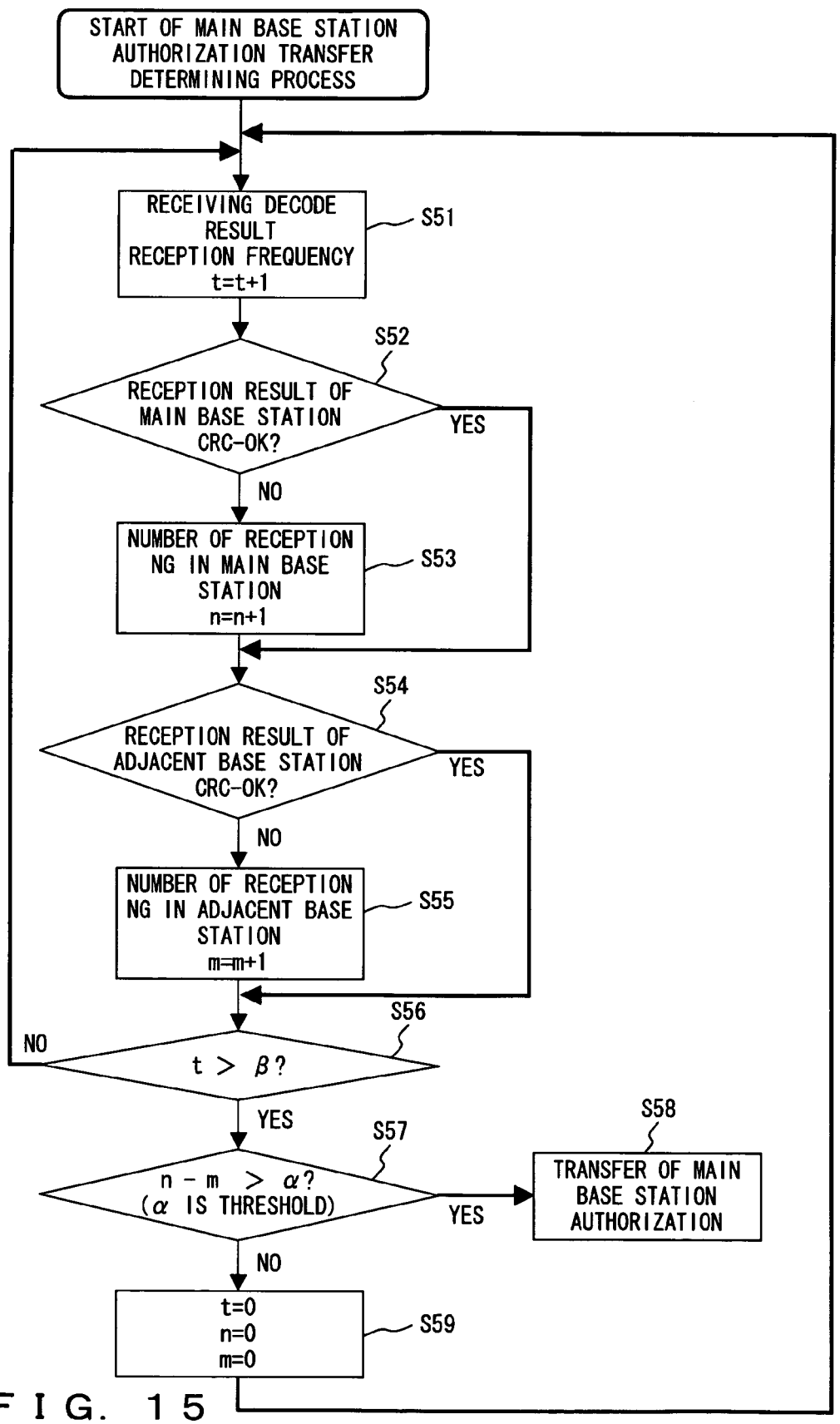
F I G. 1 5

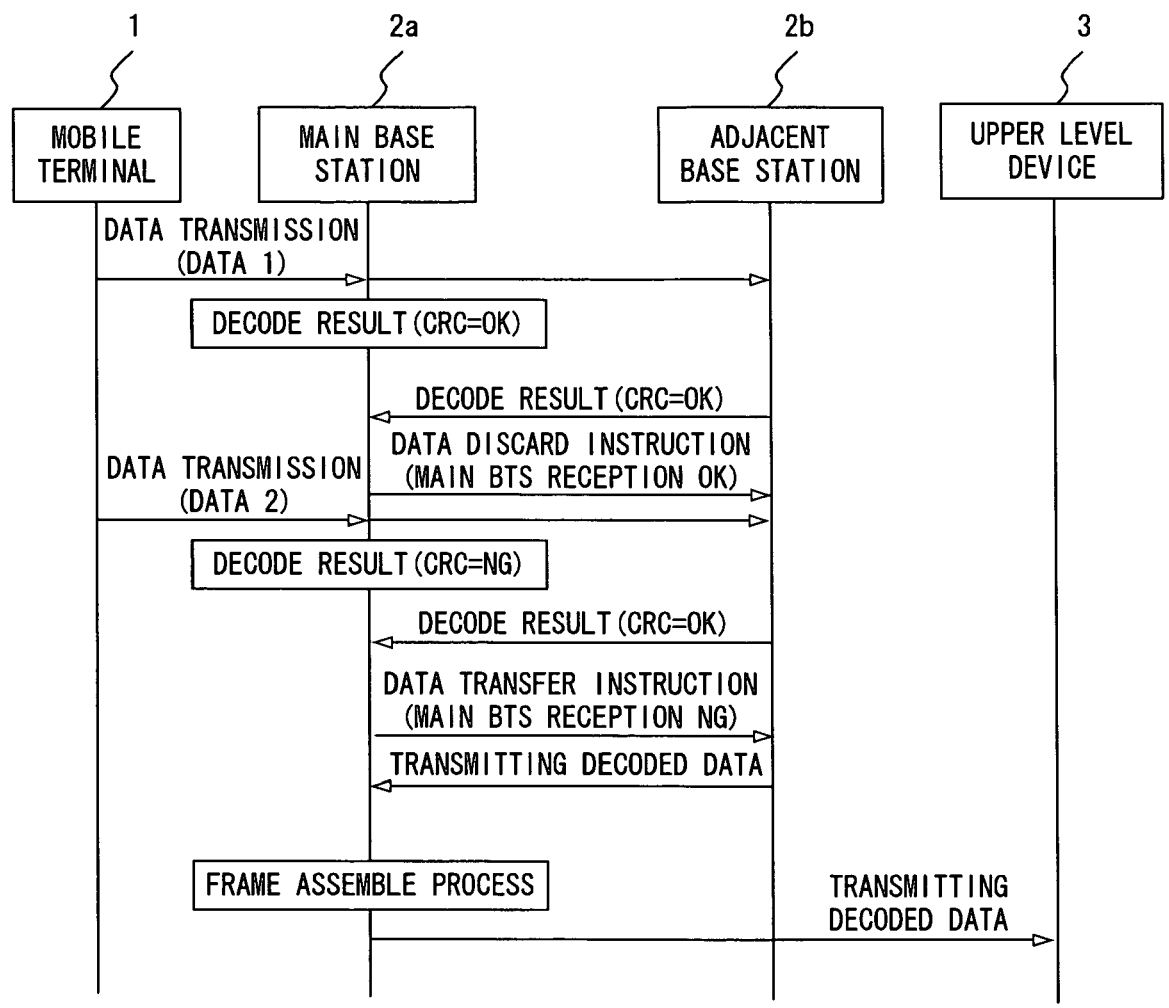
F I G. 16

COMMUNICATION METHOD USED IN MOBILE COMMUNICATION SYSTEM

BACKGROUND OF THE INVENTION

1. Field of the Invention

The present invention relates to a communication method used in a mobile communication system, and more specifically to a handover control performed in a mobile communication system.

2. Description of the Related Art

In the mobile communication system such as a mobile telephone system, etc., there can be a bit error occurring in a wireless region (that is, a wireless link between a mobile terminal and a base station depending on the position of a mobile terminal or the radio wave circumstance between the mobile terminal and the base station. Therefore, a system for implementing a retransmission control function for retransmitting data when an error occurs in a wireless region has conventionally been known. For example, high-speed down-link packet access (HSDPA) and high-speed uplink packet access (HSUPA) standardized in the third generation partnership project (3GPP) have the function of performing retransmission control between a base station and a mobile terminal when a bit error occurs in a wireless region.

However, when a mobile terminal moves from a communication area of a base station to a communication area of another base station, handover is performed to continue the communication. When the handover is performed, the radio waves transmitted from the mobile terminal reaches a plurality of base stations. However, in the HSDPA, the so-called hard handover is performed. That is, in the hard handover, a mobile terminal is not simultaneously connected to a plurality of base stations. On the other hand, in the HSUPS, a mobile terminal can be simultaneously connected to a plurality of base stations. In this case, an upper level device selects and combines data. That is, the data transmitted from a mobile terminal is received by a plurality of base stations, and the upper level device selects one of them. However, since a circuit from a base station to the upper level device transmits information not to be used, a wasteful configuration is designed. Especially when there is a large amount of data, an influence on the system capacity becomes large. When the hard handover is performed in the system corresponding to the HSUPA, the first base station performs retransmission control if a transmission error occurs before the handover from the first base station to the second base station, and the second base station performs the retransmission control if a transmission error occurs after the handover.

The patent document 1 (Japanese Published Patent Application No. H10-145835) describes a mobile communication system in which a plurality set of frames including the same data are transmitted from a mobile terminal to an exchange apparatus via different base stations while a handover is performed in the mobile communication system, and the frame having the lowest error rate is selected by the exchange apparatus and transferred to a destination. In this system, the mobile terminal is simultaneously connected to a plurality of base stations while the handover is performed. That is, in this system, so-called software handover is performed. However, the patent document 1 does not practically describe the retransmission control performed when a transmission error occurs.

In the mobile communication system in which the hard handover is performed, when the radio environment between the mobile terminal and the base stations is undesired, the data retransmission frequency between them becomes high, and the data transmission efficiency becomes low.

In the system described in the patent document 1, since data is constantly transmitted from a plurality of base stations to an exchange apparatus while the handover is performed, the load of a network between them is heavy.

SUMMARY OF THE INVENTION

The present invention aims at reducing the data retransmission frequency in the mobile communication system, and improving the data transmission efficiency.

The communication method according to the present invention is used in the mobile communication system provided with a first base station, a second base station, and an upper level device for connection to the base stations. The first base station is authorized to request a mobile terminal to retransmit data. Each base station receives the same data from the mobile terminal through the corresponding up-link. Each base station monitors the error in the corresponding up-link. When no error is detected in the first base station, the data is transferred from the first base station to the upper level device. When an error is detected in the first base station and no error is detected in the second base station, then the data is transferred from the second base station to the upper level device, the first information, which is generated in response to a situation that error is detected in the second base station, is transmitted to the first base station, and a retransmission request from the first base station to the mobile terminal is prohibited according to the first information.

In the mobile communication system, a radio signal transmitted from a mobile terminal is received not only by the first base station but also by the second base station while the handover is performed. According to the present invention, a radio signal received by the second base station is effectively used. That is to say, in the method of the present invention, although an error is detected in the first base station, the data transmitted from a mobile terminal is transferred via the second base station to an upper level device if no error is detected in the second base station. At this time, the first base station does not request the mobile terminal to retransmit data. As a result, the data transmission efficiency is improved.

Since the data retransmission frequency is reduced between a base station and a mobile terminal in the mobile communication system, the data transmission efficiency is improved. In addition, the circuit between the base station and its upper level device is efficiently used.

BRIEF DESCRIPTION OF THE DRAWINGS

FIG. 1 shows the configuration of the mobile communication system according to an embodiment of the present invention;

FIG. 3 shows an embodiment of the status management table;

FIG. 4 shows the configuration of the upper level device according to the first embodiment of the present invention;

FIG. 5 shows an embodiment of the handover management table;

FIGS. 7A and 7B show updating the status management table and the handover management table;

FIG. 15 is a flowchart of another embodiment of switching the main base station; and FIG. 16 shows the data transmission sequence according to another embodiment of the present invention.

DESCRIPTION OF THE PREFERRED EMBODIMENTS

Figure 2:
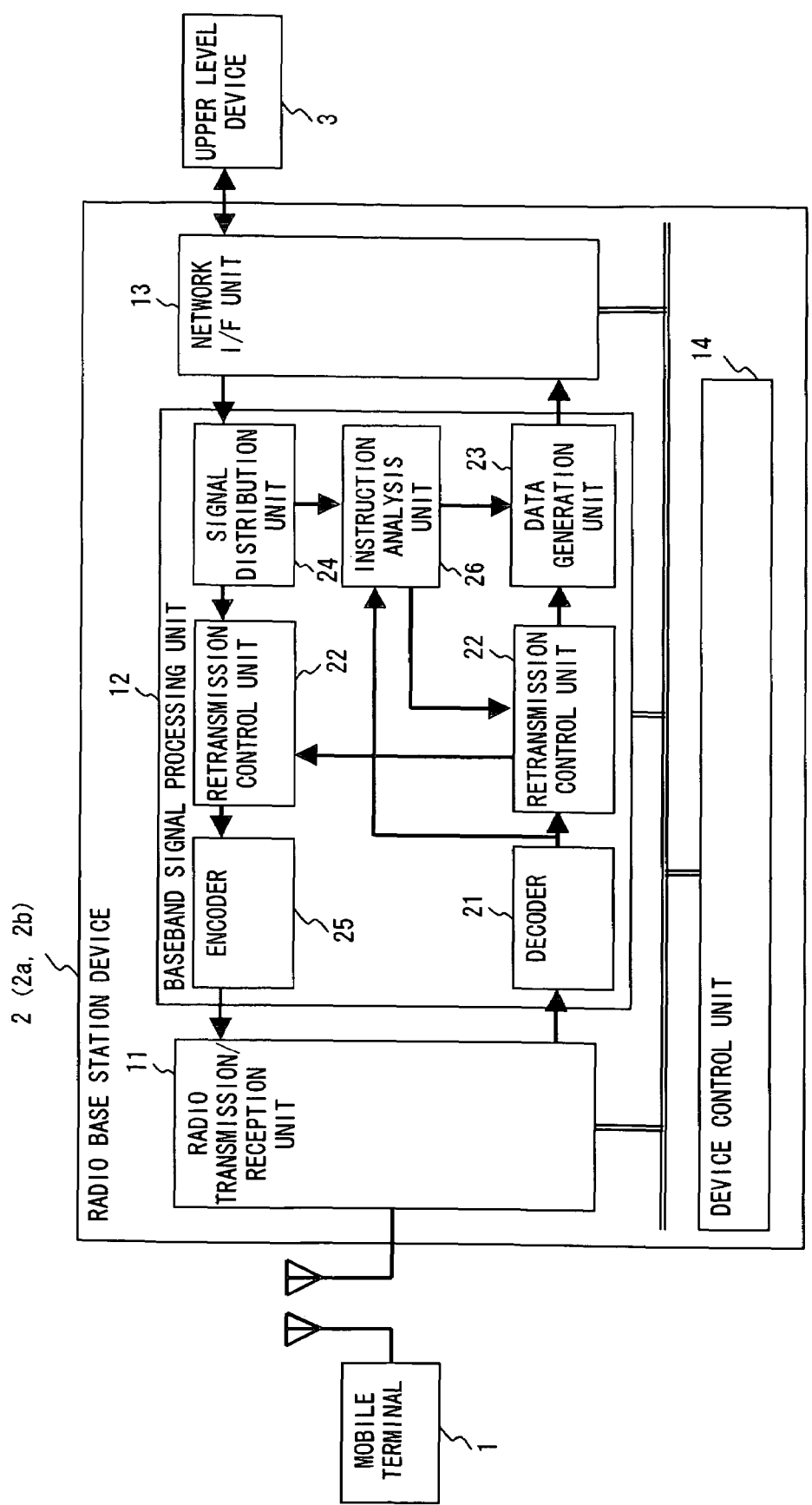
FIG. 2 shows the configuration of the base station device according to the first embodiment of the present invention.

FIG. 1 shows the configuration of the mobile communication system according to an embodiment of the present invention. The mobile communication system is not specifically restricted, but can be, for example, a mobile telephone system in a cellular system.

A mobile terminal 1 transmits and receives a radio signal to and from a base station device 2 to communicate with a correspondent terminal not shown in the attached drawings. An interface (modulation system, coding system, etc.) between the mobile terminal 1 and the base station device 2 is not specifically restricted, but can be realized by a well-known technology. However, the radio frame (at least the radio frame transmitted through the up-link from the mobile terminal 1 to the base station device 2) transmitted between the mobile terminal 1 and the base station device 2 is assigned a code for bit error detection. Furthermore, the radio frame can be assigned a code for error correction.

Each of the base station devices 2 (2a and 2b) is connected to an upper level device 3. The base station device 2 transfers the data received from the mobile terminal 1 to the upper level device 3, and also transfers the data received from the upper level device 3 to the mobile terminal 1.

The upper level device 3 accommodates a plurality of base station devices 2, and is connected to a mobile telephone network 4. The mobile telephone network 4 is connected to a public network/IP network 5. The upper level device 3 outputs the data received from the base station device 2 to the mobile telephone network 4, and transfers the data received from the mobile telephone network 4 to a corresponding base station device 2. The upper level device 3 corresponds to abase station control device in the third generation mobile telephone system.

In the mobile communication system with the above-mentioned configuration, when the mobile terminal 1 moves from the communication area of a base station device (for example, the base station device 2a) to the communication area of another base station device (for example, the base station device 2b), the handover is performed to continue communications. When a bit error (or a transmission error) occurs in the up-link in which the mobile terminal 1 transmits data to the base station device 2, the data retransmitting procedure is performed between the mobile terminal 1 and the base station device 2.

First Embodiment

The first embodiment of the present invention is based on the configuration in which the upper level device 3 manages and controls the operation of each base station device 2. The first embodiment can be applied to the general third generation mobile telephone system.

FIG. 2 shows the configuration of the base station device 2 according to the first embodiment of the present invention. In FIG. 2, a radio transmission/reception unit 11 transmits and receives data to and from the mobile terminal 1 through a wireless link. The radio transmission/reception unit 11 has the function of converting a received signal from the mobile terminal 1 from a radio frequency band to a baseband frequency band, and the function of converting a transmission signal to the mobile terminal 1 from a baseband frequency band to a radio frequency band. A baseband signal processing unit 12 encodes/decodes data, performs data retransmission, etc. A network I/F unit 13 provides an interface between the base station device 2 and the upper level device 3. A device control unit 14 controls the entire base station device (that is, the radio transmission/reception unit 11, the baseband signal processing unit 12, and the network I/F unit 13) for setting a wireless link, etc. according to an instruction from the upper level device 3.

A decoder 21 decodes a signal received from the mobile terminal 1, and monitors the bit error in the decoded data. The bit error is detected in, for example, a CRC arithmetic operation. Then, the monitor result (that is, the presence/absence of a bit error) is noticed to a retransmission control unit 22 and an instruction analysis unit 26. When an error correction code is used, an error notification may be issued only when a generated error cannot be corrected.

The retransmission control unit 22 notifies the upper level device 3 of a monitor result obtained by the decoder 21. The retransmission control unit 22 determines whether or not data retransmission control is to be performed according to an instruction from the upper level device 3. When data should be retransmitted, a retransmit instruction message is generated and transmitted to the mobile terminal 1. In FIG. 2, the retransmission control unit 22 is drawn separately in two blocks.

A data generation unit 23 generates a frame for storing decoded data, and transmits it to the network I/F unit 13. The data generation unit 23 does not generate a frame for storing decoded data when a bit error is detected or a discard instruction is received from the instruction analysis unit 26.

A signal distribution unit 24 distributes the signal received from the upper level device 3 to the retransmission control unit 22 or the instruction analysis unit 26. An encoder 25 encodes the data (the retransmit instruction message when retransmission control is performed) to be transmitted to the mobile terminal 1, and transmits it to the radio transmission/ reception unit 11. The instruction analysis unit 26 analyzes an instruction from the upper level device 3, and notifies the retransmission control unit 22 and/or the data generation unit 23 of the instruction.

FIG. 3 shows an embodiment of the status management table. The status management table manages whether or not a relevant base station is authorized to provide a retransmission function for each mobile terminal. For example, in the example shown in FIG. 3, the base station is authorized to provide a retransmission function for the mobile terminals (#1, #3), but is not authorized for the mobile terminal (#2). When a base station transmits and receives a radio signal to and from a mobile terminal, and is authorized to request the mobile terminal to retransmit data, the base station operates as a "main base station" of the mobile terminal. On the other hand, if a base station transmits and receives a radio signal to and from a mobile terminal, but is not authorized to request the mobile terminal to retransmit data, then the base station operates as an "adjacent base station" of the mobile terminal. The status management table also manages whether or not each mobile terminal belongs to the handover region. For example, in the example shown in FIG. 3, the mobile terminals (#1, #2) belong to the handover region, but the mobile terminal (#3) does not. The status management table is provided in, for example, the retransmission control unit 22.

FIG. 4 shows the configuration of the upper level device 3 according to the first embodiment of the present invention. In FIG. 4, each of base station I/F units 31 (31a through 31n) provides an interface with the base station device 2 corresponding to the upper level device 3. A network I/F unit 32 provides an interface between the upper level device 3 and the mobile telephone network 4. A discrimination unit 33 transmits an instruction to a corresponding base station device according to the monitor result information transmitted from each base station device 2. The discrimination unit 33 refers to the handover management table shown in FIG. 5 when the instruction is to be generated. A switch 34 connects the base station I/F unit 31, the network I/F unit 32, and the discrimination unit 33.

FIG. 5 shows an embodiment of a handover management table. A main base station and one or more adjacent base station can be registered in the handover management table for each mobile terminal located in a handover region. For example, in the example shown in FIG. 5, the mobile terminal (#1) is connected to the base station devices 2a and 2b, and the base station device 2a operates as a main base station, and the base station device 2b operates as an adjacent base station.

Figure 6:
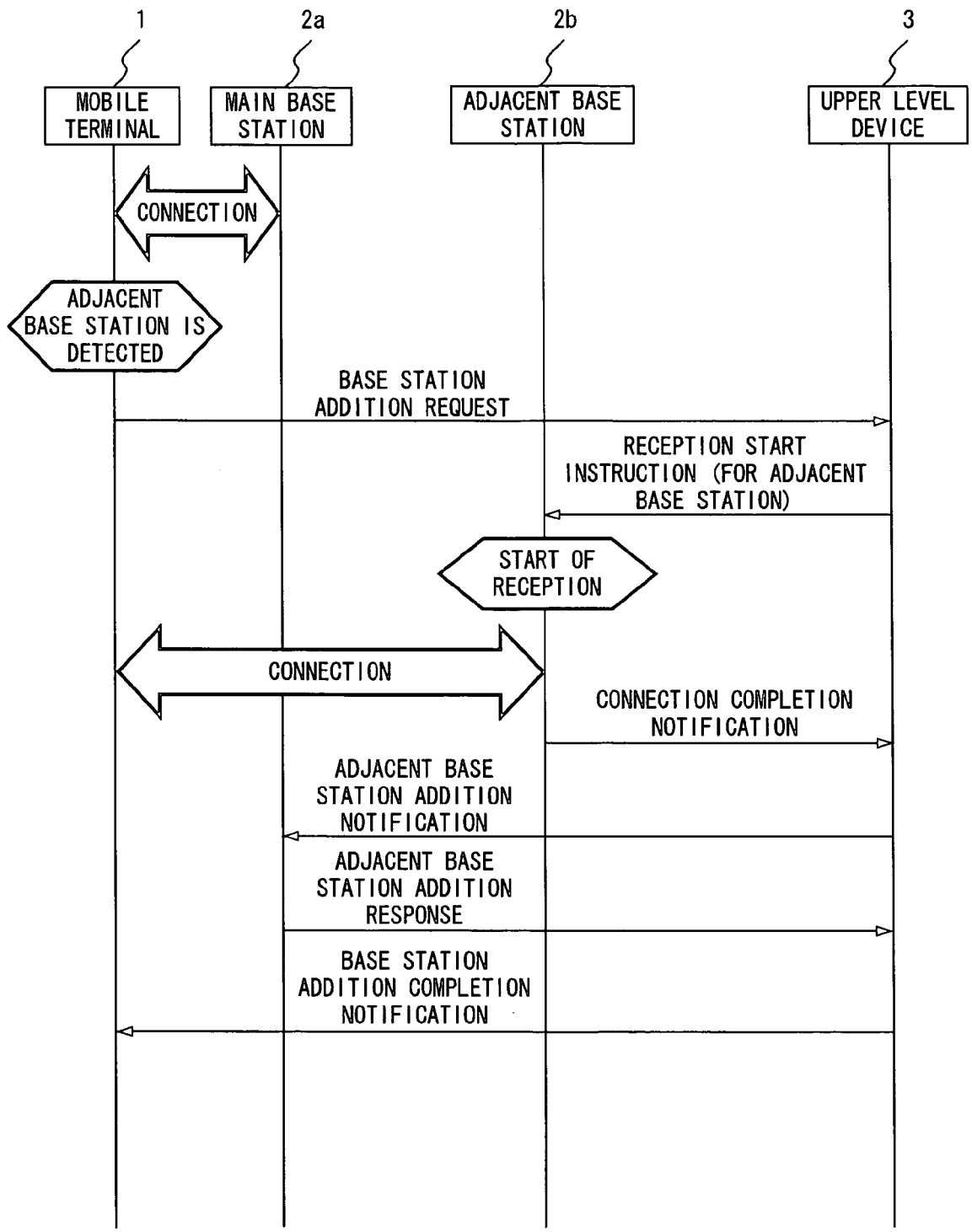
FIG. 6 shows the handover start sequence.

FIG. 6 shows the handover start sequence. FIGS. 7A and 7B show updating the status management table and the handover management table. The operation performed when the handover is started is explained by referring to FIGS. 6, 7A, and 7B. In the explanation below, it is assumed that the mobile terminal 1 (#1) has originated a call in the communication area of the base station device 2a.

When the mobile terminal 1 (#1) originates a call in the communication area of the base station device 2a, it is connected to the base station device 2a. Then, as shown in FIG. 7A, the mobile terminal 1 (#1) is registered in the status management table of the base station device 2a. At this time, since the mobile terminal 1 (#1) is connected only to the base station device 2a, the base station device 2a is authorized to perform retransmission control on the mobile terminal 1 (#1). The authorization is allowed by, for example, the upper level device 3 in response to the call origination. Afterwards, the base station device 2a operates as a main base station to the mobile terminal 1 (#1).

Here, it is assumed that the mobile terminal 1 (#1) moves toward the communication area of the base station device 2b while connecting to the base station device 2a. Then, when the mobile terminal 1 (#1) detects the radio waves from the base station device 2b, it transmits a base station addition request to the upper level device 3. Upon receipt of the request, the upper level device 3 transmits a reception start instruction (including an adjacent base station setting instruction) to the base station device 2b. Thus, the mobile terminal 1 (#1) is connected to both of the base station devices 2a and 2b. Additionally, the base station device 2b registers the mobile terminal 1 (#1) in the status management table as shown in FIG. 7B. At this time, the reception start instruction includes the adjacent base station setting instruction. Therefore, the base station device 2b operates as an adjacent base station of the mobile terminal 1 (#1). That is to say, the base station device 2b is not authorized to perform retransmission control on the mobile terminal 1 (#1), though it is connected to the mobile terminal 1 (#1).

When the base station device 2b is connected to the mobile terminal 1 (#1), it transmits a connection completion notification to the upper level device 3. Upon receipt of the connection completion notification, the upper level device 3 registers the mobile terminal 1 (#1) in the handover management table as shown in FIG. 7B. At this time, the base station device 2a is registered as a main base station, and the base station device 2b is registered as an adjacent base station. Furthermore, the upper level device 3 transmits an adjacent base station addition notification to the base station device 2a.

Upon receipt of the adjacent base station addition notification, the base station device 2a updates the handover management table as shown in FIG. 7B. That is, the notification that the mobile terminal 1 (#1) has moved into a handover region is recorded. Afterwards, the base station device 2a transmits an adjacent base station addition response to the upper level device 3, and the upper level device 3 transmits a base station addition completion notification to the mobile terminal 1 (#1).

In the above-mentioned sequence, the mobile terminal 1 (#1) is connected to both of the base station devices 2a and 2b. Afterwards, the base station device 2a operates as a main base station, and the base station device 2b operates as an adjacent base station.

Figure 8:
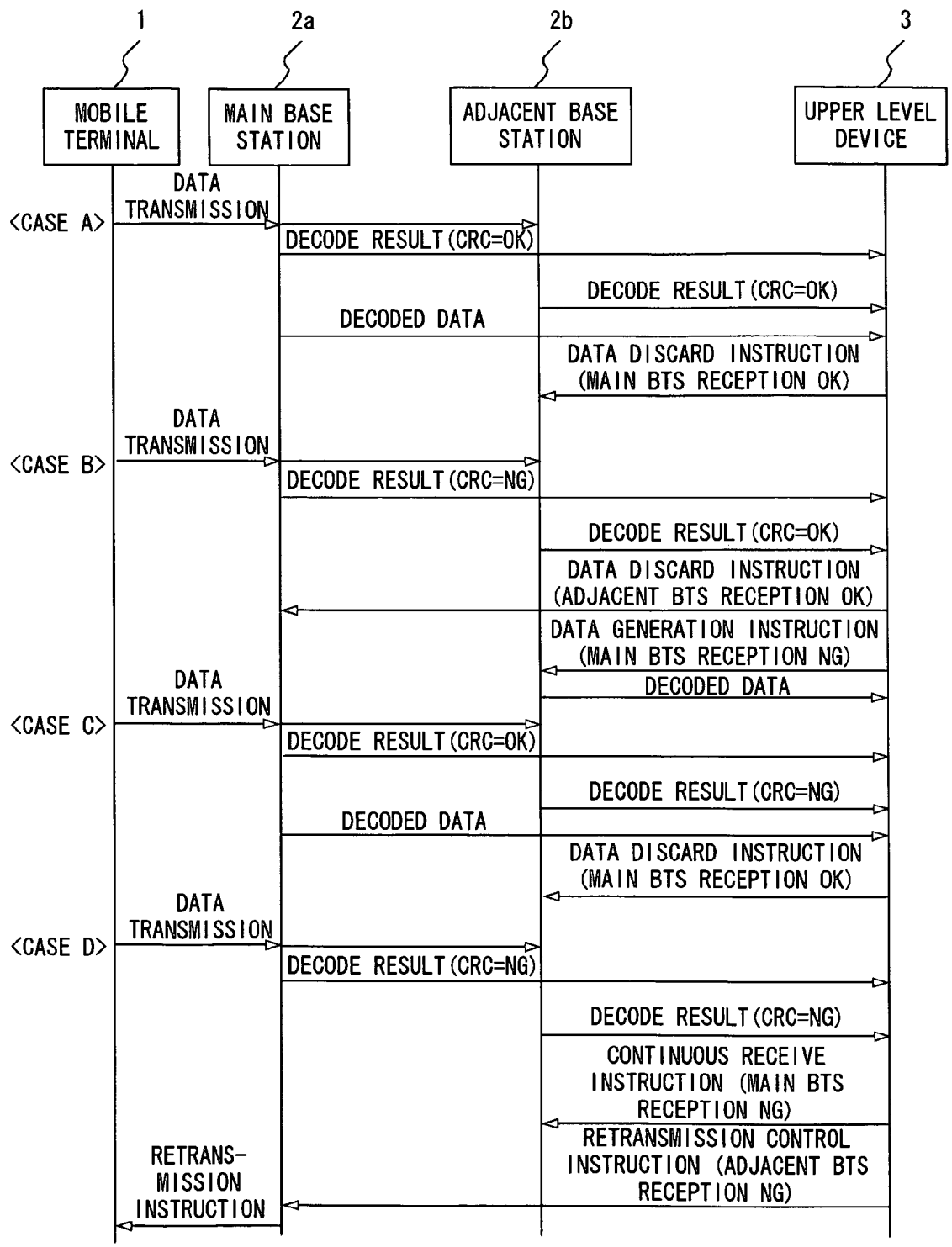
FIG. 8 shows the data transmission sequence according to the first embodiment of the present invention.

FIG. 8 shows the data transmission sequence according to the first embodiment of the present invention. In this example, it is assumed that the mobile terminal 1 is connected to both of the main base station (base station device 2a) and the adjacent base station (base station device 2b). That is, the radio signal transmitted from the mobile terminal 1 is received by both of the main base station and the adjacent base station.

Upon receipt of the radio signal from the mobile terminal 1, each of the main base station and the adjacent base station decodes received data, and checks the presence/absence of a bit error (when an error correction code is used, it means an uncorrectable error). It is assumed that CRC arithmetic operation is performed for the error check as an example.

The case A shows an operation performed when no bit error is detected in any of the main base station and the adjacent base station. In this case, each of the main base station and the adjacent base station transmits "CRC=OK" to the upper level device 3 as decode result information. The main base station immediately transfers decoded data to the upper level device 3. The upper level device 3 transmits a data discard instruction to the adjacent base station according to the received decode result information. Then, the adjacent base station discards decoded data according to the instruction.

Upon receipt of "CRC=OK" as the decode result information from the main base station, the upper level device 3 may transmit a data generation instruction to the main base station. In this case, the main base station transmits the decoded data to the upper level device 3 after receiving the data generation instruction.

The case B shows the operation performed when a bit error is detected in the main base station and no bit error is detected in the adjacent base station. In this case, the main base station does not transmit decoded data. The upper level device 3 receives "CRC=NG" as decode result information from the main base station, and receives "CRC=OK" as decode result information from the adjacent base station. Then, the upper level device 3 transmits a data discard instruction to the main base station, and transmits a data generation instruction to the adjacent base station. The main base station discards decoded data according to the data discard instruction. Although the main base station is authorized to request a mobile terminal to retransmit data, it does not request the retransmission when it receives the data discard instruction. That is, in this case, the data discard instruction transmitted from the upper level device 3 to the main base station functions as an instruction to prohibit a retransmission request from the main base station to the mobile terminal 1. On the other hand, the adjacent base station transfers decoded data to the upper level device 3 according to the data generation instruction.

As described above, even when a bit error is detected in the main base station, the retransmission control is not performed unless a bit error is detected in the adjacent base station, and the data transmitted from the mobile terminal 1 is transferred to the upper level device 3 through the adjacent base station. That is, by the adjacent base station effectively using radio waves received from mobile terminal 1 when the handover is performed, the occurrence of data retransmission can be avoided. As a result, the data transmission efficiency is improved. When the handover is performed, the decode result information is transmitted from a plurality of base stations to the upper level device 3, the data amount of the decode result information is much smaller than the amount of the decoded data. Therefore, the resources between the base station and the upper level device 3 are not wasted.

The case C shows the operation performed when no bit error is detected in the main base station, and a bit error is detected in the adjacent base station. Since the operation of the case C is basically the same as in the case A, the explanation is omitted here.

The case D shows the operation performed when a bit error is detected by both of the main base station and the adjacent base station. In this case, each of the main base station and the adjacent base station transmits "CRC=NG" as decode result information to the upper level device 3. Thus, the upper level device 3 transmits a continuous receive instruction to the adjacent base station, and transmits a retransmission control instruction to the main base station. Upon receipt of the continuous receive instruction, the adjacent base station holds decoded data. On the other hand, upon receipt of the retransmission control instruction, the main base station holds decoded data, and transmits a retransmission instruction to the mobile terminal 1. Then, the mobile terminal 1 retransmits the previously transmitted data according to the retransmission instruction.

Upon receipt of the data retransmitted from the mobile terminal 1, each of the main base station and the adjacent base station holds the previously received and decoded data. Each of the main base station and the adjacent base station recovers data using both of the previously received data and the newly received data. Thus, the occurrence of a bit error can be suppressed. This data recovery can be realized by, for example, using the HARQ prescribed by the 3GPP.

Figure 9:
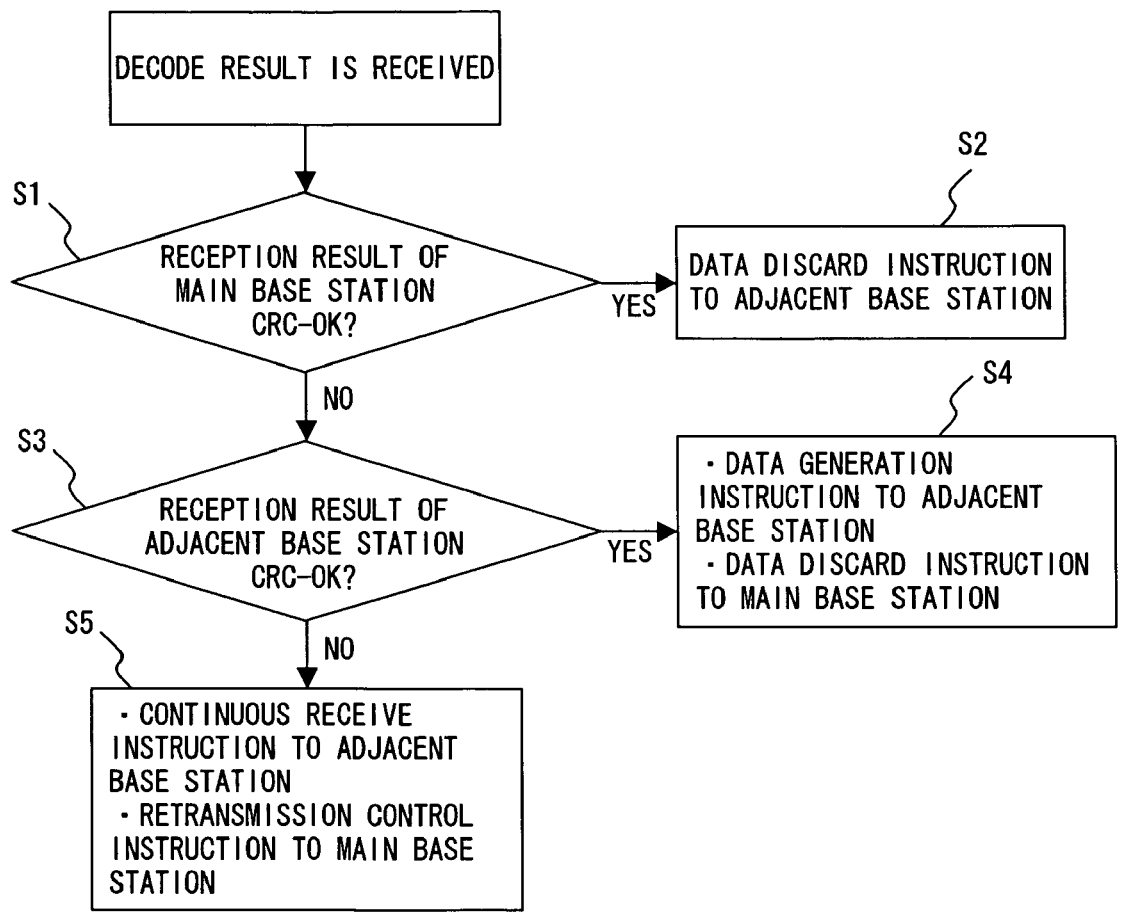
FIG. 9 is a flowchart of the operation of the upper level device according to the first embodiment of the present invention.

FIG. 9 is a flowchart showing the operation of the upper level device according to the first embodiment of the present invention. The process of the flowchart is performed by the discrimination unit 33 when decode result information is received from each base station (main base station and adjacent base station).

In step S1, a reception result of the main base station is analyzed. Unless a bit error has occurred in the up-link from the mobile terminal 1 to the main base station (that is, CRC=OK), a data discard instruction is transmitted to the adjacent base station in step S2. The adjacent base station discards decoded data according to the instruction. In the processes described above, when no bit error is detected in the main base station, the data decoded in the main base station is used. Therefore, the data decoded in the adjacent base station is discarded. In the operation example shown in FIG. 8, the process in step S2 is performed in the cases A and C.

If a bit error has occurred in the up-link from the mobile terminal 1 to the main base station (that is, CRC=NG), a reception result in the adjacent base station is analyzed in step S3. If no bit error has occurred in the up-link from the mobile terminal 1 to the adjacent base station (that is, CRC=OK), control is passed to step S4. In step S4, a data generation instruction is transmitted to the adjacent base station, and a data discard instruction is transmitted to the main base station. Thus, the adjacent base station transmits decoded data to the upper level device 3. The main base station discards decoded data. Thus, if no bit error has been detected in the adjacent base station when a bit error is detected in the main base station, the data decoded in the adjacent base station is used. In the operation example shown in FIG. 8, the process in step S4 is performed in the case B.

When a bit error also occurs in the up-link from the mobile terminal 1 to the adjacent base station (that is, CRC=NG), control is passed to step S5. In step S5, a continuous receive instruction is transmitted to the adjacent base station, and a retransmission control instruction is transmitted to the main base station. Thus, the adjacent base station holds the decoded data. The main base station requests the mobile terminal 1 to retransmit data. Thus, when a bit error is detected in both of the main base station and the adjacent base station, the data is retransmitted. In the operation example shown in FIG. 8, the process in step S5 is performed in the case D.

Figure 10:
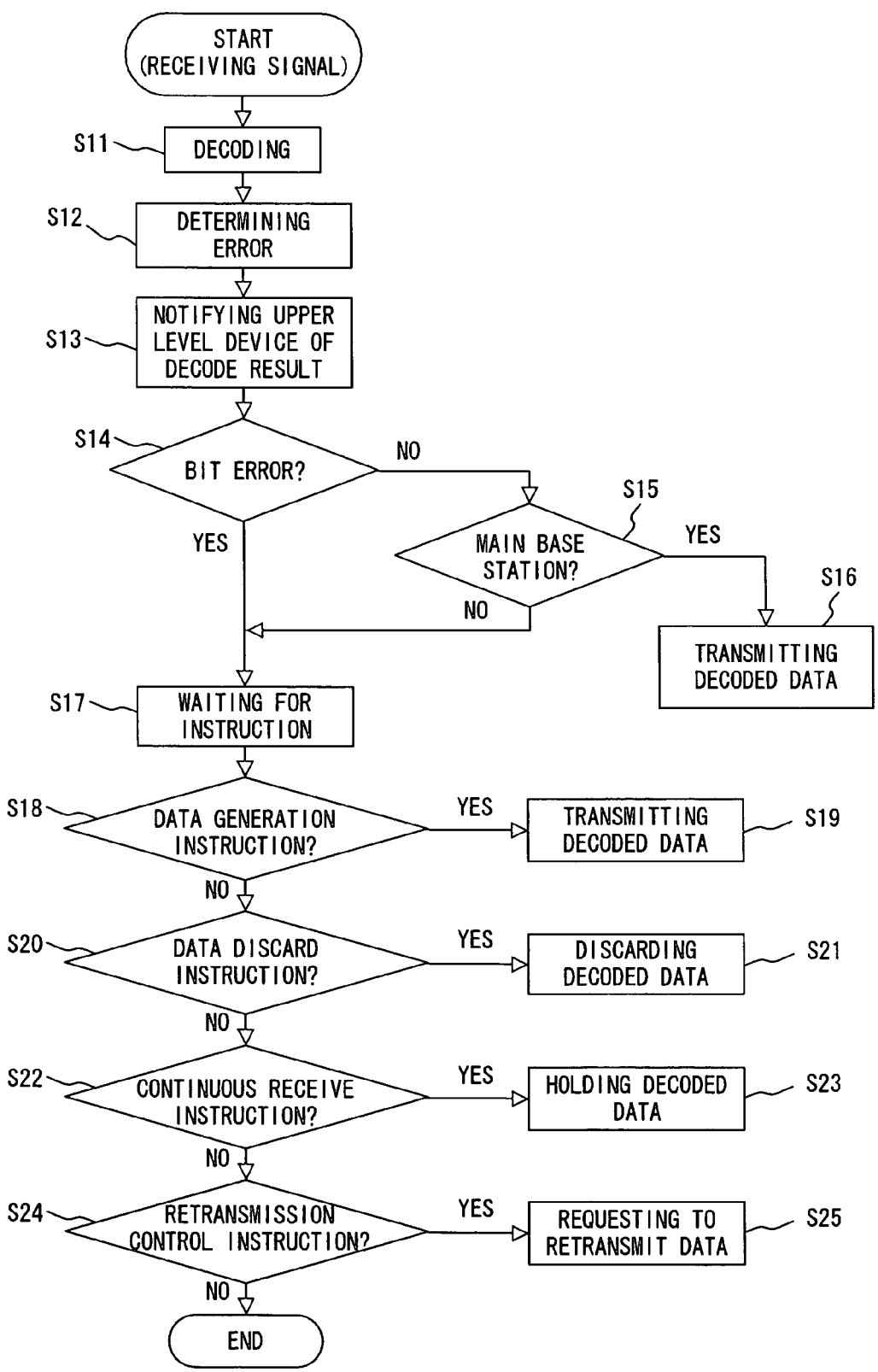
FIG. 10 is a flowchart of the operation of the base station device according to the first embodiment of the present invention.

FIG. 10 is a flowchart of the operation of the base station device according to the first embodiment of the present invention. The process of the flowchart is performed mainly by the decoder 21, the retransmission control unit 22, and the instruction analysis unit 26 when a radio signal is received from the mobile terminal 1.

In step S11, the data received from the mobile terminal 1 is decoded. In steps S12 through S14, it is checked whether or not there is a bit error in the decoded data, and the detection result (in this example, the result of the CRC arithmetic operation) is noticed to the upper level device 3. In step S15, it is checked whether or not the base station is a main base station. That is, by referring to the status management table shown in FIG. 3, it is determined as a main base station if it is authorized to provide a retransmission function, and it is determined as an adjacent base station if it is not authorized to provide a retransmission function. If a bit error is not detected (No in step S14), and the base station is a main base station (Yes in step S15), the decoded data is transmitted to the upper level device 3 in step S16.

In steps S17 through S25, the operation is performed according to the instruction from the upper level device 3. That is, when a data generation instruction is received, decoded data is transmitted to the upper level device 3. When a data discard instruction is received, the decoded data is discarded. When a continuous receive instruction is received, the decoded data is held. When a retransmission control instruction is received, the mobile terminal 1 is requested to retransmit data. The retransmission control instruction is not transmitted to an adjacent base station.

Second Embodiment

The configuration of the mobile communication system according to the second embodiment of the present invention is basically the same as that according to the first embodiment of the present invention. However, in the system according to the second embodiment, some functions of the upper level device according to the first embodiment are provided by each base station device. For example, the handover between the base stations is performed by the base stations exchanging necessary information. The second embodiment can be realized by, for example, using the base station discussed by the evolved UTRA and UTRAN of the 3GPP.

Figure 11:
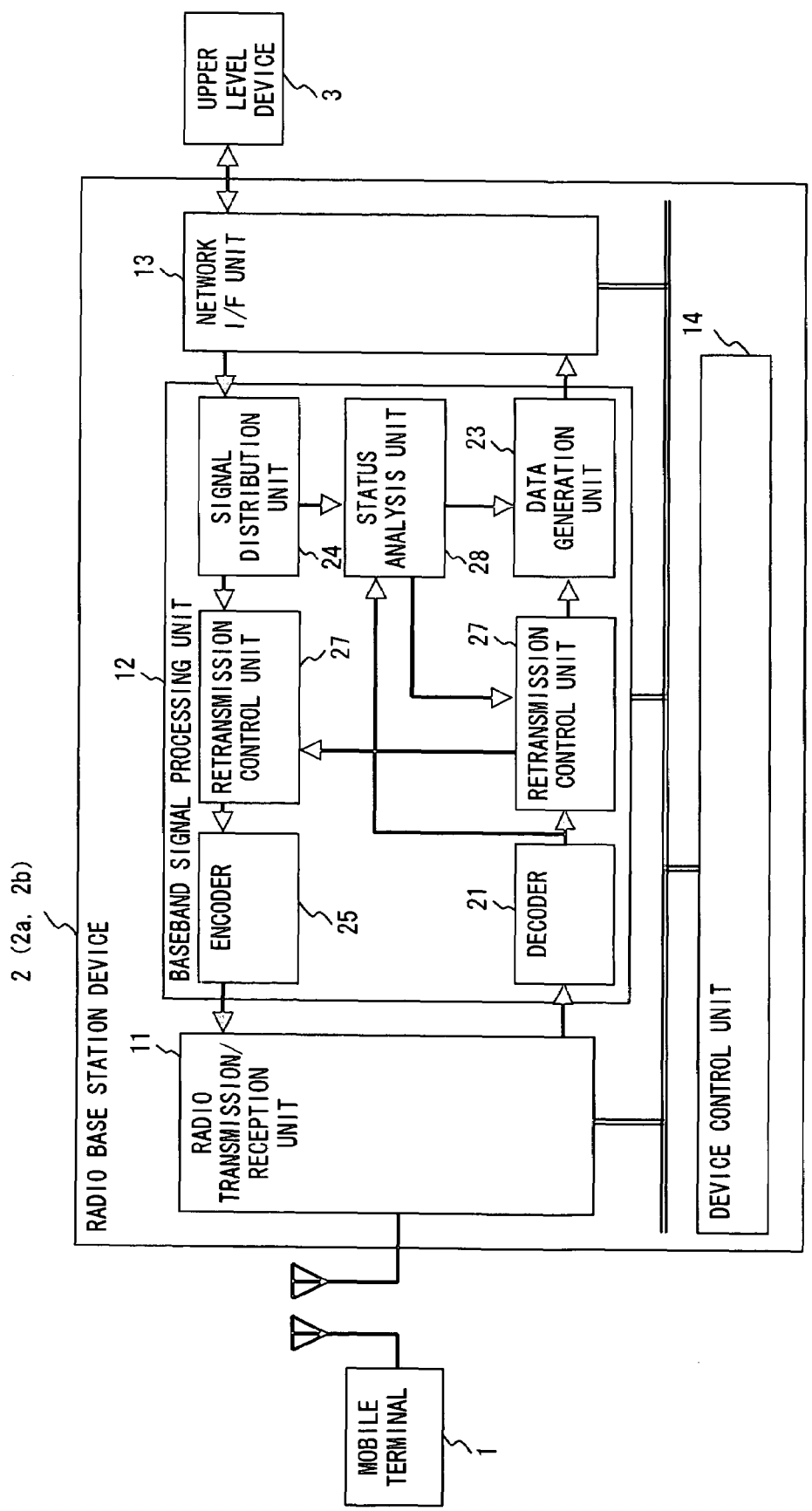
FIG. 11 shows the configuration of the base station device according to the second embodiment of the present invention.

FIG. 11 shows the configuration of the base station device 2 according to the second embodiment of the present invention. The configuration of the base station device according to the second embodiment is basically the same as that according to the first embodiment. However, a retransmission control unit 27 provided for the base station according to the second embodiment is not the same as the retransmission control unit 22 according to the first embodiment. In addition, the base station device according to the second embodiment is provided with a status analysis unit 28 in place of the instruction analysis unit 26.

When the base station device 2 operates as an adjacent base station, the retransmission control unit 27 transmits decode result information (in this embodiment, a result of the CRC arithmetic operation) to the main base station. The status analysis unit 28 processes (transmits, discards, or holds) the decoded data according to the instruction from the main base station. On the other hand, when the base station device 2 operates as a main base station, the status analysis unit 28 determines the operation of the base station and the adjacent base station based on the decoding result of the base station and the decoding result of the adjacent base station.

By referring to the status management table shown in FIG. 3 as in the first embodiment of the present invention, it is determined whether each base station device operates as a main base station or an adjacent base station. The status management table can be updated by exchanging the information between the base stations. The retransmission control unit 27 and the status analysis unit 28 of the base station device according to the second embodiment provide the functions of the discrimination unit 33 installed in the upper level device 3 according to the first embodiment. Therefore, the upper level device 3 according to the second embodiment is not provided with the discrimination unit 33.

Figure 12:
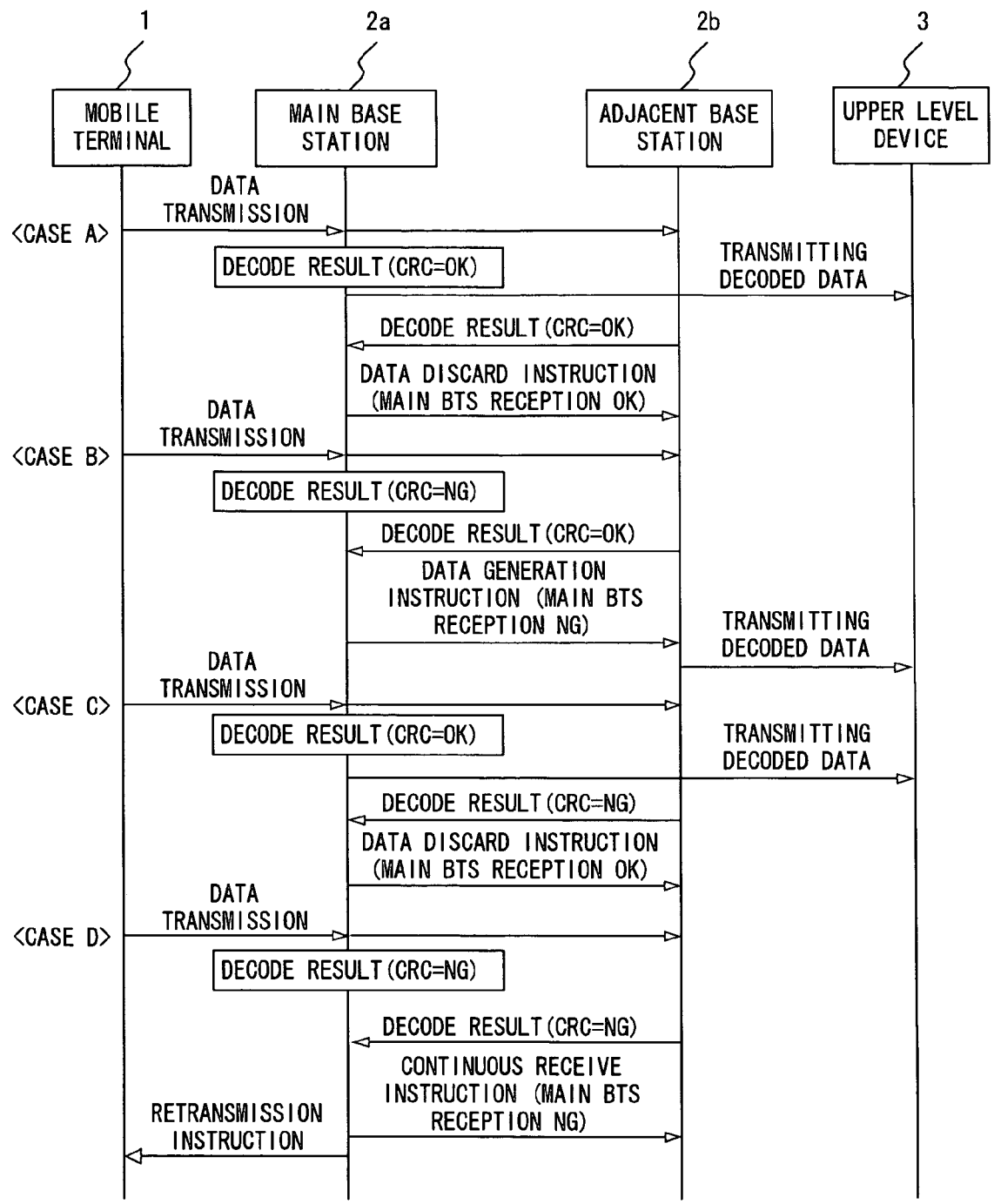
FIG. 12 shows the data transmission sequence according to the second embodiment of the present invention.

FIG. 12 shows the data transmission sequence according to the second embodiment. In this example, the mobile terminal 1 is assumed to be connected to both of the base station device 2a (main base station) and the base station device (adjacent base station) 2b.

As shown in the cases A and C, the main base station transfers decoded data immediately to the upper level device 3 if no bit error is detected in the decoded data. In this case, the decoded data obtained in the adjacent base station is not necessary any more. Therefore, the main base station transmits a data discard instruction to an adjacent base station regardless of whether or not a bit error has been detected in an adjacent base station. Then, the adjacent base station discards decoded data according to the instruction.

The case B shows the operation performed when a bit error is detected in the main base station, and no bit error is detected in an adjacent base station. In this case, the main base station receives "CRC=OK" as decode result information from the adjacent base station. Then, the main base station transmits a data generation instruction to the adjacent base station. According to the instruction, the adjacent base station transfers decoded data to the upper level device 3. In this case, the main base station does not request the mobile terminal 1 to retransmit data although a bit error has been detected.

The case D shows the operation performed when a bit error is detected in both main base station and adjacent base station. In this case, the main base station receives "CRC=NG" as decode result information from the adjacent base station. Then, the main base station transmits a continuous receive instruction to the adjacent base station, and transmits a retransmission instruction to the mobile terminal 1. According to the retransmission instruction, the mobile terminal 1 retransmits the previously transmitted data.

Thus, in the second embodiment of the present invention, the operation of each base station is determined by the main base station, and the main base station transmits an instruction to the adjacent base station.

Figure 13:
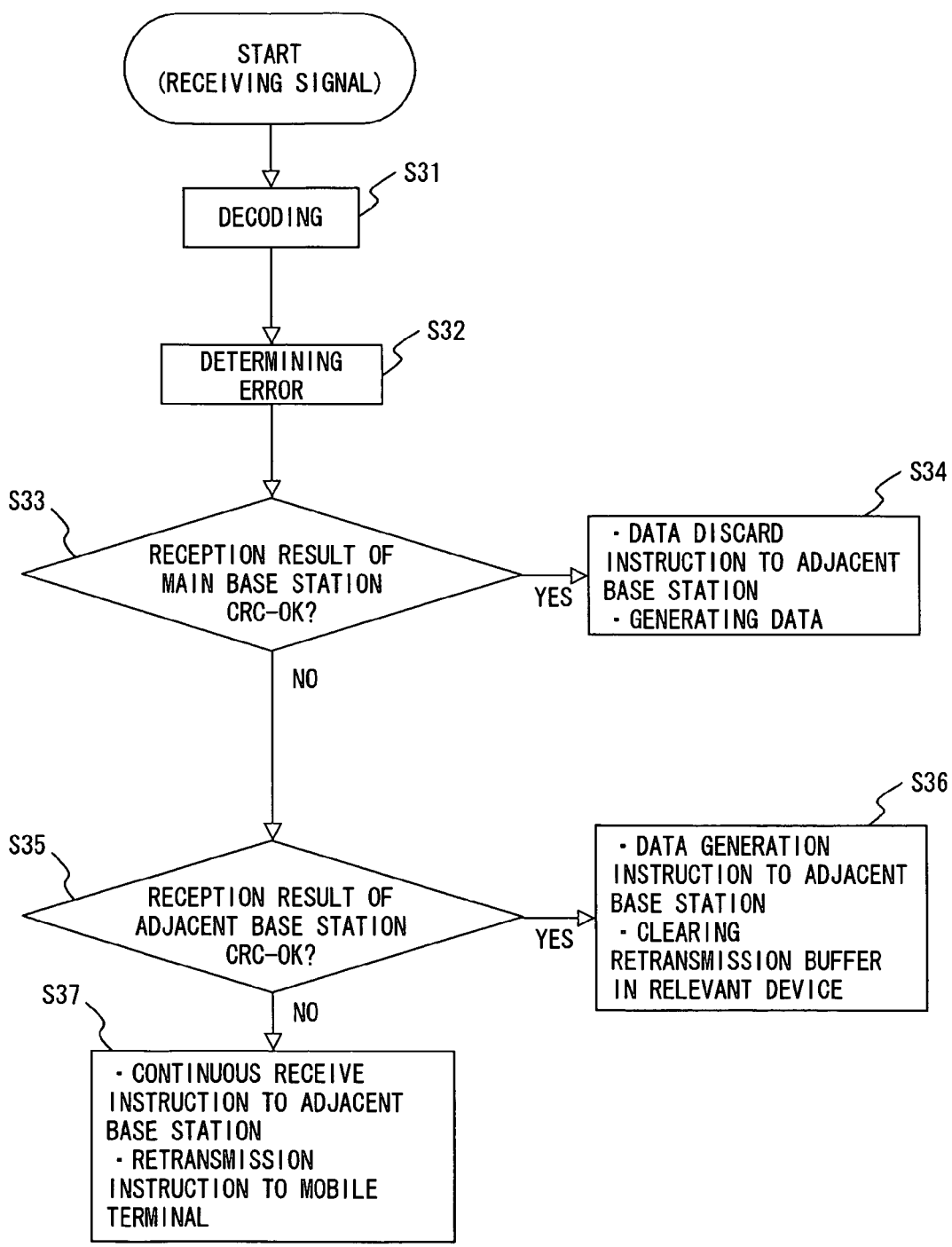
FIG. 13 is a flowchart of the operation of the main base station according to the second embodiment of the present invention.

FIG. 13 is a flowchart of the operation performed by the main base station according to the second embodiment of the present invention. The processes in this flowchart are performed mainly by the decoder 21, the retransmission control unit 27, and the status analysis unit 28 when a radio signal is received from the mobile terminal 1.

In step S31, the data received from the mobile terminal 1 is decoded. In step S32, it is checked whether or not there is a bit error in the decoded data. In the present embodiment, a CRC arithmetic operation is performed. In step S33, it is checked whether or not a bit error has been detected in the main base station.

If no bit error is detected in the main base station, the decoded data is transferred to the upper level device 3 in step S34. In addition, the main base station transmits a data discard instruction to the adjacent base station. Thus, the adjacent base station discards the decoded data. In the operation example shown in FIG. 12, the process in step S34 is performed in the cases A and C.

If a bit error has been detected in the main base station, the reception result of the adjacent base station is referred to in step S35. Unless a bit error has been detected in the adjacent base station, control is passed to step S36. In step S36, the decoded data held in the main base station is discarded. In addition, the main base station transmits a data generation instruction to the adjacent base station. Thus, the adjacent base station transmits the decoded data to the upper level device 3. As described above, if no bit error has been detected in the adjacent base station when a bit error is detected in the main base station, then the data decoded in the adjacent base station is used. In the operation example shown in FIG. 12, the process in step S36 is performed in the case B.

When a bit error is detected also in the adjacent base station, control is passed to step S37. In step S37, a retransmission instruction is transmitted to the mobile terminal 1, and a continuous receive instruction is transmitted to the adjacent base station. Then, the mobile terminal 1 retransmits the previously transmitted data. In addition, the adjacent base station holds the decoded data. Thus, when a bit error is detected in both of the main base station and the adjacent base station, data is retransmitted. In the operation example shown in FIG. 12, the process in step S37 is performed in the case D.

The operation of the adjacent base station according to the second embodiment is performed basically according to the flowchart shown in FIG. 10. However, in the second embodiment, decode result information is transmitted from the adjacent base station to the main base station. In addition, the adjacent base station receives the data generation instruction, a data discard instruction, or a continuous receive instruction from the main base station.

<Switch of Main Base Stations>

The mobile terminal 1 is connected to both of the main base station and the adjacent base station in the handover region. Each of the main base station and the adjacent base station decodes the radio signal received from the mobile terminal 1, monitors a bit error in the decoded data. Then, the frequency of occurrences of bit errors in the main base station is compared with the frequency of occurrences of bit errors in the adjacent base station, and whether or not the main base station is to be switched is determined based on the comparison result.

Figure 14:
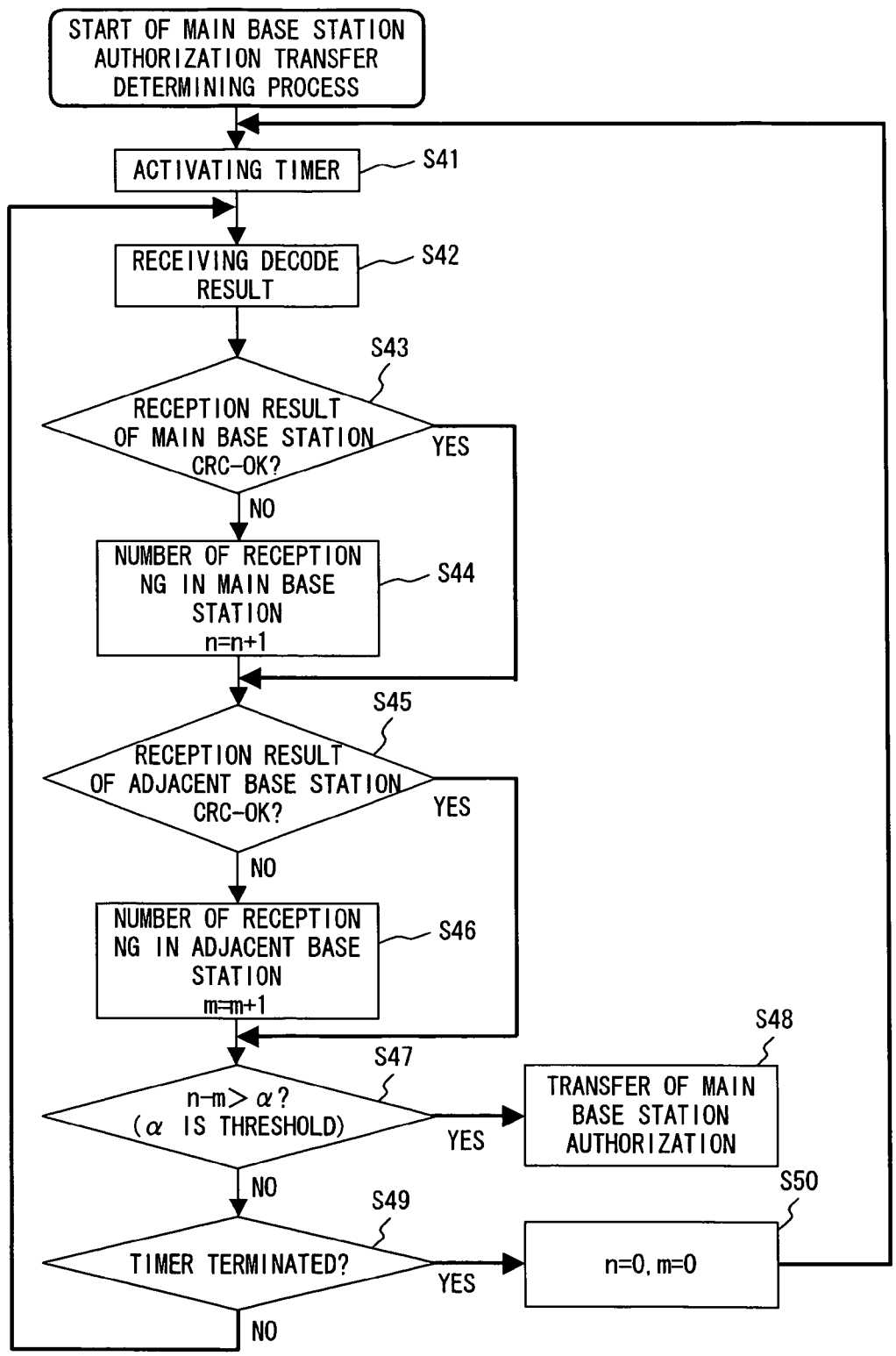
FIG. 14 is a flowchart of switching the main base station.

FIG. 14 is a flowchart of the process of switching a main base station. FIG. 14 shows the procedure of determining whether or not the main base station is to be switched by comparing a number of bit errors occurring in a predetermined time. This process is performed by the upper level device 3 in the first embodiment, and by the main base station in the second embodiment.

In step S41, a timer is activated. The timer terminates when a predetermined time has passed from the activation time. In step S42, a decode result (in the embodiment, a CRC arithmetic result) in each base station is received. In steps S43 and S44, it is checked whether or not the main base station has detected a bit error. If a bit error has been detected, the variable n is incremented. Similarly, in steps S45 and S46, it is checked whether or not a bit error has been detected in the adjacent base station. If a bit error has been detected, the variable m is incremented.

In step S47, the variable n is compared with the variable m. If the variable n is larger than the variable m, and the difference between n and m exceeds the threshold a, then the main base station is switched in step S48. Here, the main base station is authorized to perform retransmission control on the mobile terminal 1, and the adjacent base station is not authorized. Therefore, in step S48, the authorization is transferred from the base station device which has been operating as a main base station to the base station device which has been operating as an adjacent base station. Practically, the status management table shown in FIG. 3 and the handover management table shown in FIG. 5 are updated. Thus, the base station device which has been operating as a main base station starts operating as an adjacent base station. The base station device which has been operating as an adjacent base station starts operating as a main base station.

In step S49, it is checked whether or not the timer has terminated. If it has not terminated, control is returned to step S42. If it has terminated, the variables n and m are reset in step S50, and then control is returned to step S41.

The threshold α can be zero or any predetermined positive value. When the threshold α is set small, the base station device with fewer bit errors can be immediately selected as a main base station. However, if the threshold α is set small, there is the possibility that a switch of a main base station frequently occurs depending on the radio environment. Therefore, it is preferable that the threshold α is appropriate selected depending on the radio environment.

Although the termination time of the timer is not limited, it can be, for example, several hundred milliseconds through several seconds. If the termination time of the timer is too short, the determination as to whether or not the main base station is to be switched can be inappropriately made. On the other hand, if the termination time of the timer is too long, the determination as to whether or not the main base station is to be switched can be delayed. Therefore, the termination time of the timer is to be appropriately set with all these factors taken into account.

FIG. 15 is a flowchart of another embodiment of the process of switching a main base station. In this embodiment, each time the amount of data of the information transmitted from the mobile terminal reaches a predetermined value, it is determined whether or not a main base station is to be switched. This process is performed by the upper level device 3 according to the first embodiment, and by the main base station according to the second embodiment.

In step S51, upon receipt of a decode result (in this example, the CRC arithmetic operation result) in each base station, the variable t is incremented. The processes in steps S52 through S55 are the same as those in steps S43 through S46 shown in FIG. 14. In step S56, it is checked whether or not the variable t has exceeded a predetermined number β. If the variable t has exceeded the predetermined number β, control is passed to step S57. Otherwise, control is returned to step S51.

Steps S57 and S58 are basically the same as steps S47 and S48 shown in FIG. 14. That is, if the variable n is larger than the variable m, and the difference between n and m is larger than the threshold α, then the main base station is switched. If the condition of step S57 is not satisfied, the variables t, n, and m are reset in step S59, and control is returned to step S51.

Other Embodiments

FIG. 16 shows the data transmission sequence according to another embodiment. In this example, it is assumed that the frame transmitted between the base station device 2 and the upper level device 3 is larger than the radio data block transmitted between the mobile terminal 1 and the base station device 2, and a frame is made of a plurality of radio data blocks (in the embodiment, data 1 and data 2).

First, the data 1 is transmitted from the mobile terminal 1. In this example, it is assumed that no bit error has been detected in the main base station. Then, the main base station holds decoded data of the data 1. The adjacent base station discards the decoded data of the data 1 according to the data discard instruction from the main base station.

Then, the mobile terminal 1 transmits the data 2. In this example, it is assumed that a bit error is detected in the main base station, and no bit error has been detected in the adjacent base station. In this case, the main base station recognizes according to the notification from the adjacent base station that there in no bit error has occurred in the adjacent base station. Thus, the main base station transmits a data transfer instruction to the adjacent base station. Upon receipt of the instruction, the adjacent base station transfers the decoded data of the data 2 to the main base station. The main base station assembles a frame from the decoded data of the data 1 obtained in the main base station and the decoded data of the data 2 obtained in the adjacent base station, and transmits the frame to the upper level device 3.

The present invention is not limited to the embodiments explained above-mentioned by referring to FIGS. 1 through 16. That is, for example, there can be two or more adjacent base stations when the handover is performed. The mobile communication system according to the above-mentioned embodiments is provided with a plurality of base stations, but the present invention can also be applied to a system provided with access points in place of the base stations.

What is claimed is:

1. A communication method for use in a mobile communication system having a first base station, a second base station, and an upper level device connected to the base stations, comprising:
   authorizing the first base station to request a mobile terminal to retransmit data;
   receiving same data through a corresponding up-link from the mobile terminal in each base station;
   monitoring an error in the corresponding up-link in each base station; and
   transferring the data from the first base station to the upper level device when no error is detected in the first base station, wherein
   when an error is detected in the first base station and no error is detected in the second base station, the data is transferred from the second base station to the upper level device;

first information, which is generated in response to a situation that no error is detected in the second base station, is transmitted to the first base station, a retransmission request from the first base station to the mobile terminal is prohibited according to the first information.

2. The communication method according to claim 1, wherein when an error detected in the first base station and the second base station, second information which is generated when an error is detected in the second base station is transmitted to the first base station; and the first base station requests the mobile terminal to retransmit data according to the second information.

3. The communication method according to claim 1, wherein:

each base station transmits a monitor result about a corresponding up-link to the upper level device; and the upper level device controls an operation of each base station based on the monitor results.

4. The communication method according to claim 1, wherein:

the second base station transmits a monitor result about a corresponding up-link to the first base station; and the first base station controls an operation of each base station based on the monitor results in the first and second base stations.

5. The communication method according to claim 1, wherein:

a frequency of occurrences of an error detected in the first base station is compared with a frequency of occurrences of an error detected in the second base station; and it is determined based on a comparison result whether or not authorization of requesting the retransmission is to be transferred from the first base station to the second base station.

6. The communication method according to claim 5, wherein:

when the frequency of occurrences of an error detected in the first base station is higher than the frequency of occurrences of an error detected in the second base station, and a difference between the frequencies of occurrences is higher than a predetermined threshold, the authorization of requesting the retransmission is transferred from the first base station to the second base station.

7. The communication method according to claim 5, wherein the frequencies are compared at predetermined time intervals.

8. The communication method according to claim 5, wherein the frequencies are compared each time an amount of data received from the mobile terminal reaches a predetermined amount.

9. The communication method according to claim 1, wherein:

when no error is detected in the first base station, the first base station holds the data received from the mobile terminal;

when an error is detected in the first base station and no error is detected in the second base station, the second base station transfers the data received from the mobile terminal to the first base station; and the first base station assembles a frame including the data received from the second base station, and transmits the frame to the upper level device.

10. A mobile communication system having a main base station, an adjacent base station provided adjacent to the main base station, and an upper level device connected to the base stations, comprising:

a retransmission unit which is provided in the main base station and requests a mobile terminal to retransmit data;

a reception unit which is provided in each of the main base station and the adjacent base station and receives same data through a corresponding up-link from the mobile terminal;

a monitor unit which is provided in each of the main base station and the adjacent base station and monitors an error in the corresponding up-link; and a control unit which prohibits a retransmission request of said retransmission unit and requests the adjacent base station to transfer the data to the upper level device when an error is detected in the main base station and no error is detected in the adjacent base station.

11. The mobile communication system according to claim 10, wherein said control unit allows said retransmission unit to request retransmission when an error is detected in the main base station and the adjacent base station.

12. The mobile communication system according to claim 10, wherein:

said control unit is provided in the upper level device;

each of the main base station and the adjacent base station notifies said control unit provided in the upper level device of a monitor result by said monitor unit; and said control unit controls the main base station and the adjacent base station based on each notification.

13. The mobile communication system according to claim 10, wherein said control unit is provided in the main base station;

the adjacent base station notifies said control unit provided in the main base station of the monitor result by said monitor unit; and said control unit controls the main base station and the adjacent base station based on the monitor result obtained by said monitor unit of the main base station and the monitor result obtained by said monitor unit of the adjacent base station.

14. A base station device operating as a main base station in a mobile communication system having the main base station, an adjacent base station provided adjacent to the main base station, and an upper level device connected to the base stations, comprising:

a retransmission unit for requesting a mobile terminal to retransmit data;

a reception unit for receiving data transmitted from the mobile terminal to both the main base station and the adjacent base station through a corresponding up-link;

a monitor unit for monitoring an error in the corresponding up-link;

a detection unit for detecting whether or not an error has occurred in an up-link from the mobile terminal to the adjacent base station; and a control unit for prohibiting a retransmission request of said retransmission unit and requesting the adjacent base station to transfer the data to the upper level device when an error is detected in the main base station and no error is detected in the adjacent base station.

* * * * *